May 5, 1953   J. J. COLEMAN ET AL   2,637,756
DEFERRED ACTION BATTERY
Filed Jan. 25, 1951   3 Sheets-Sheet 1
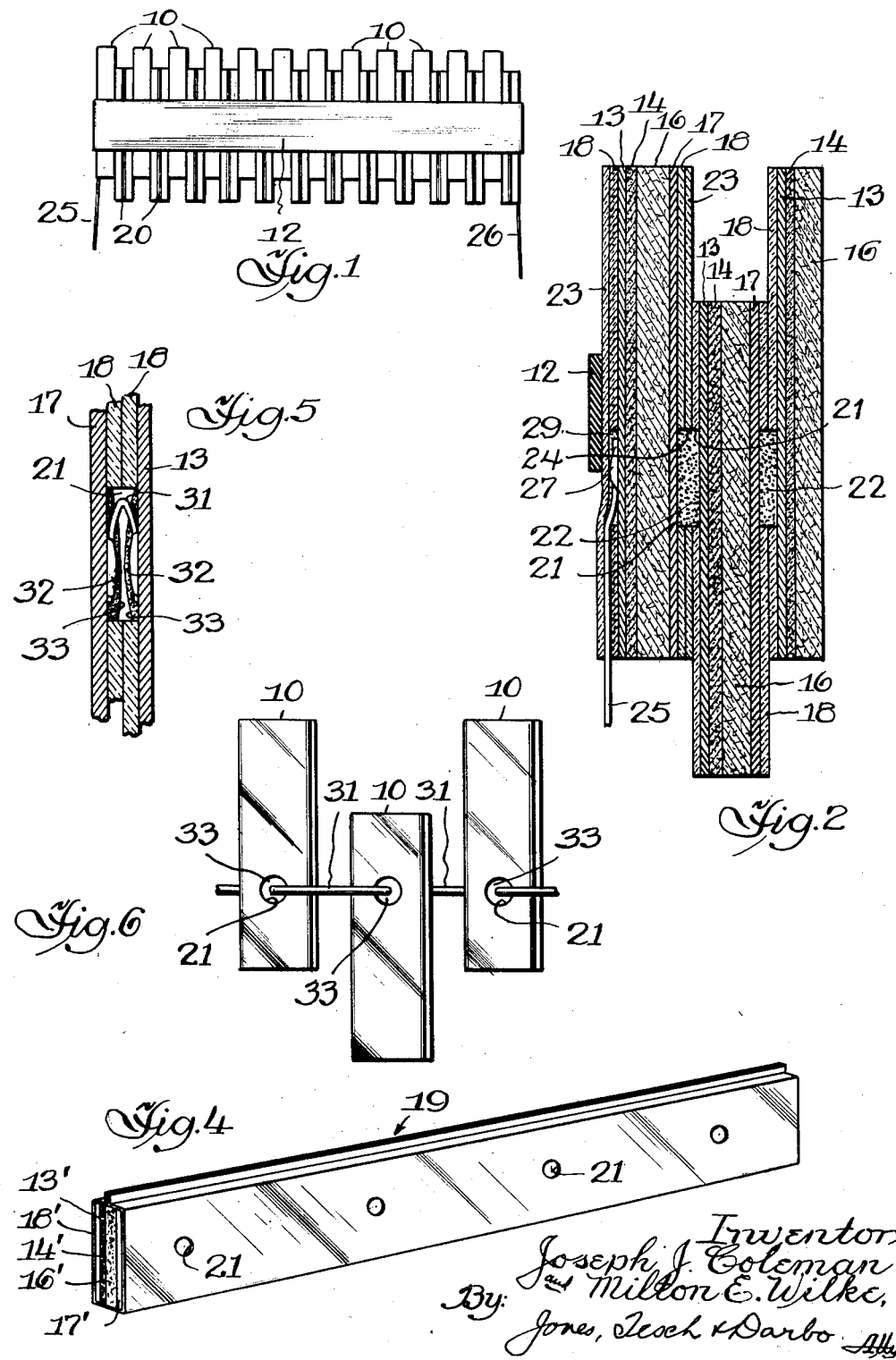

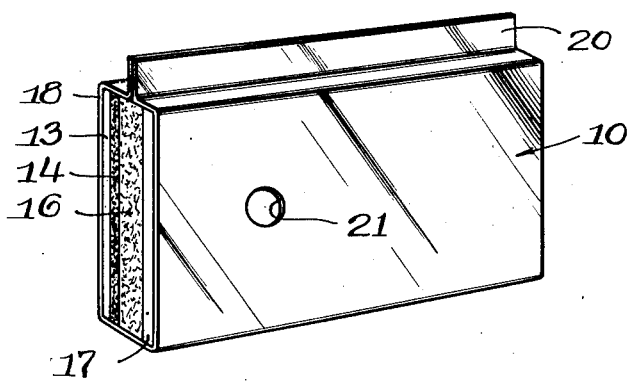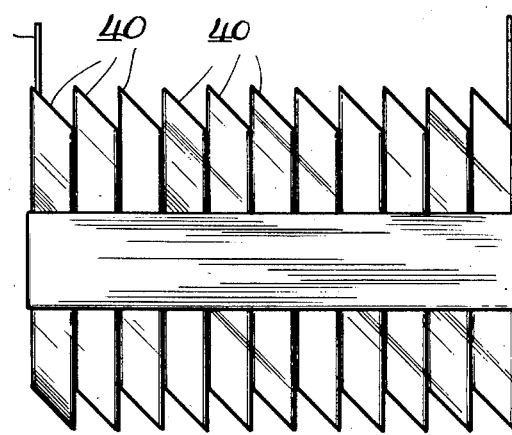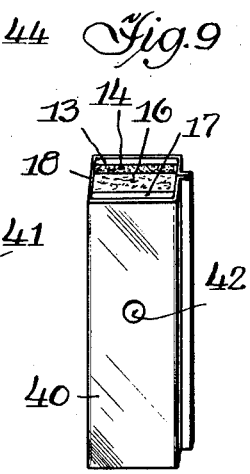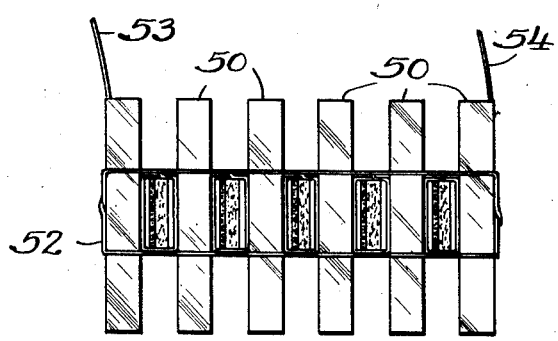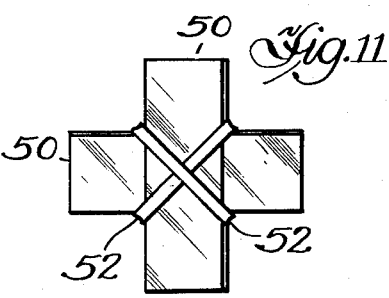

May 5, 1953 J. J. COLEMAN ET AL 2,637,756
DEFERRED ACTION BATTERY
Filed Jan. 25, 1951 3 Sheets-Sheet 3
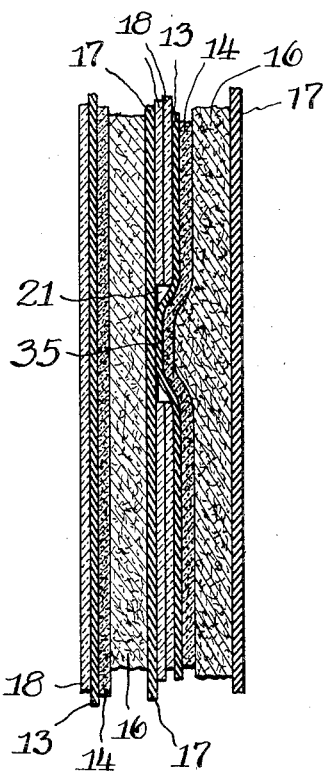
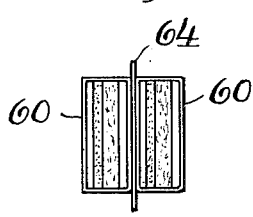
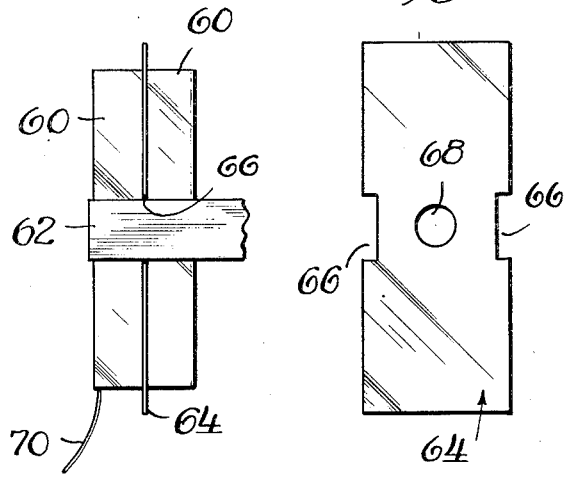
Inventors,
Joseph J. Coleman
and Milton E. Wilke,
By: Jones, Jesch & Darbo Attys.

Patented May 5, 1953

2,637,756

UNITED STATES PATENT OFFICE 2,637,756

DEFERRED ACTION BATTERY

Joseph J. Coleman and Milton E. Wilke, Freeport, Ill., assignors to Burgess Battery Company, Freeport, Ill., a corporation of Delaware Application January 25, 1951, Serial No. 207,722

9 Claims. (Cl. 136—111)

This invention relates to improvements in primary batteries and particularly to primary batteries of the deferred action type. More especially, it relates to improvements in a multiple cell deferred action battery which is adapted to be energized by bringing a quantity of activating liquid in contact with the cells thereof. For example, it may be activated by being dipped or immersed in a body of activating liquid. Specifically, the invention relates to batteries of the character described in which the cells are of the flat type.

In batteries of the general character described, the interiors of the cells are exposed to the surrounding space so that all of the cells may be activated simultaneously by contact with a common body of the activating liquid. The difficulty has been encountered that not only does the activating liquid go into the cells but it remains at the surfaces where the cells adjoin each other, and forms bridges between the elements of adjacent cells, as the positive electrode of one cell and the negative electrode of the adjacent cell. As a consequence local action takes place at the negative electrodes and short circuits occur between the cells, with the result that the voltage of the battery is reduced and the energy is dissipated.

It is an object of the invention to provide a construction for batteries of the type described in which such local action and short circuits are substantially eliminated.

A further object is to provide an improved battery of the character described in which the structure is simple and economical.

Another object is to provide a battery structure and method of making the same which make possible the rapid, economical and simple manufacture of the batteries.

Another object is to provide a battery structure and method of making the same which render possible the economical manufacture of a wide variety of sizes of cells and batteries.

A further object is to provide a battery of the character described in which the intercell connections are not exposed and therefore not subject to corrosion.

Another object is to provide a battery of the character described in which the entire area of one surface of the metal negative electrode is exposed to the electrolyte and thereby utilized. In many flat cell batteries a so-called duplex electrode is used which consists of the negative electrode of one cell and positive electrode of the adjacent cell mechanically and electrically joined together. In some designs the edges and borders of the duplex electrodes are covered with a nonconductive, electrolyte-impervious substance in order to prevent local action and dissipation of the negative electrode. Such a covering results in a reduction in active electrode surface and is not required in the battery of the present invention.

A further object is to provide an elongated primary cell blank which is adapted to be cut into lengths to form individual cells of the battery of the invention.

Further objects are to provide methods for forming the elongated cell blank, for forming cells by cutting the blank into lengths, and for forming the battery of the invention by arranging said cells in juxtaposed relation and connecting them in series.

Other objects and advantages will become apparent from the following description, which is to be taken in conjunction with the accompanying drawings, in which Fig. 1 is a side elevation of an embodiment of the battery of the invention;

Fig. 2 is a sectional elevation of a portion of the battery of Fig. 1;

Fig. 3 is a perspective view of an individual cell adapted for use in said battery;

Fig. 4 is a perspective view of an elongated multiple-cell blank adapted to be cut into lengths to form a plurality of individual cells such as shown in Fig. 3;

Fig. 5 is an enlarged fragmental sectional elevation of a modification of the battery of the invention showing a different means for connecting the cells together;

Fig. 6 is a plan view of a group of cells connected as shown in Fig. 5 before they are brought into juxtaposed relation;

Fig. 7 is an enlarged fragmental sectional elevation showing a further means for interconnecting the cells of the battery;

Figs. 8 and 10 are side elevations of different modifications of the battery of the invention;

Fig. 9 is an elevation of a cell of the battery of Fig. 8;

Fig. 11 is an end view of the battery of Fig. 10;

Figs. 12 and 13 are fragmental side and top views, respectively, of a different embodiment of the battery of the invention; and Fig. 14 is a plan view of an inter-cell separator for use in the embodiment of Figs. 12 and 13.

The embodiment shown in Figs. 1 and 2 is a battery composed of a plurality of electrically connected flat cells 10 such as is shown in Fig. 3, arranged in face-to-face juxtaposed relationship, each cell being off-set lengthwise thereof with respect to the cells adjacent thereto and the whole assembly being held together under pressure by the encircling band or tape 12 or other suitable means.

Each cell is composed of a plurality of juxtaposed thin, flat cell elements arranged in sandwich-like relationship, said elements comprising, from left to right in Figs. 2 and 3, the positive electrode 13, the depolarizing body 14, the electrolyte-receptive element 16 and the negative electrode 17. The composition of the various elements is not important in the present invention, the essence of the invention being the arrangement of the cells and the elements thereof. In a specific embodiment of the cell, the positive electrode 13 may be composed of silver, the depolarizing body 14 of silver chloride, the electrolyte-receptive element 16 of absorbent paper such as blotting paper, and the negative electrode 17 of magnesium. The members 13 and 14 together form a composite positive electrode element for the cell. The electrodes 13 and 17 form the facing surfaces for the assembly of elements.

The assembled juxtaposed cell elements are enclosed upon all except two opposite sides thereof by a wrapper 18 which may be composed of a suitable substantially electrolyte-impervious, non-conductive material, such as paper impregnated with resin, varnish, etc., rubber hydrochloride, a form of which is commercially available under the trade mark "Pliofilm," the copolymer of vinyl acetate and vinyl chloride, polymerized ethylene, or the like. The assembly of cell elements, as shown in Fig. 3, is of greater length than width or thickness and the wrapper is formed by encircling and encasing the assembly laterally with a sheet of the material 18 and turning the meeting end portions 20 of the sheet outwardly and uniting said portions by an adhesive, or in the case of the rubber hydrochloride and polymerized ethylene products, by heat-sealing said portions together. The wrapper is preferably cemented by an adhesive to the cell elements or at least to one of the electrodes 13 or 17. A firm wrapper is thus formed which is open at the ends, exposing the ends of the cell elements. At each such end, the cell elements and the wrapper 18 are preferably caused to terminate in substantially the same plane. The resulting cell has two broad sides and two narrow sides encased by the wrapper and two open sides or ends which are exposed to the surrounding space. Upon each of the broad sides an opening 21 is provided in the wrapper exposing the positive and negative electrodes respectively, said openings being preferably nearer to one end of the cell than to the other for reasons which will be explained hereinafter.

In a preferred method for making the cells 10 the thin, flat cell elements are provided in elongated ribbon form, that is, in lengths several times and preferably many times the length of a single cell. The ribbons are assembled in juxtaposed, sandwich-like relationship as is illustrated in Fig. 4, and the assembly is enclosed laterally by an elongated wraper 18' in the same manner as described heretofore in connection with the cell of Fig. 3, and openings 21 are formed in the broad sides of the wrapper 18' at intervals spaced apart lengthwise of the blank a distance substantially equal to the length of a single cell. The openings may be formed before or after the wrapper is placed about the assembly of elongated cell elements. The elongated blank 19 so formed is then cut into lengths suitable to form the individual cells 10. Such cutting may be done by a knife, shears, or other suitable instrument.

In assembling and connecting the cells into the battery illustrated in Figs. 1 and 2, they are arranged in a stack with the broad sides thereof in face-to-face juxtaposed relationship and with their open ends directed toward the same two opposite sides of the battery. In other words, they are arranged in substantially parallel relationship, that is, with their longitudinal axes in parallel relationship. In the embodiment illustrated, the longest dimension of the cell is that extending from one open end to the other, and the axis extending in this direction is considered the longitudinal axis. The invention is not limited, however, to cells of such shape and said dimension may be equal to or less than other dimensions of the cell.

In accordance with the present invention, means are provided to prevent the formation of bridges of electrolyte between the open sides of adjacent cells. In the embodiment of Figs. 1 and 2 the cells of the battery are arranged in a zig-zag arrangement, that is, each succeeding cell is off-set or displaced in the direction of its open end with respect to the preceding cell, and the off-set of each said succeeding cell is in the opposite direction from that of the last. The result is a staggered succession of cells by reason of which the open ends of each cell are spaced a substantial distance from the open ends of the adjacent cells.

In making up the battery, the cells are all oriented similarly, for example with the positive electrodes 13 thereof all at the left side of the cells as the battery is viewed in Figs. 1 and 2. With the cells made as described heretofore, this is conveniently done by rotating alternate cells edgewise through 180° with respect to intermediate cells and arranging the openings 21 of adjacent cells to be substantially in registration with each other. The negative electrode of one cell is thereby exposed to the positive electrode of the adjacent cell and means are provided for electrically connecting such electrodes together through the openings 21. In the embodiment of Figs. 1 and 2 the connecting means is a conductive wax composition such as is described in the copending application of Sam Kurlandsky, Serial No. 161,892, filed May 13, 1950, which composition may be composed of finely divided silver particles, preferably precipitated silver particles, and a waxy binder-lubricant, which may be of microcrystalline wax, beeswax, paraffin, candelilla, montan, or the like.

The conductive wax is preferably applied by heating it sufficiently to soften it and then applying a small quantity 22 thereof to each of the exposed electrodes of the cells 10 at the openings 21 prior to the assembly of the battery. If desired, sufficient of the composition may be used to close the opening and form a seal closure at each of the openings 21.

The cells are assembled as shown in Fig. 2 with the openings 21 exposing to each other the positive electrode 13 and negative electrode 17 of each pair of adjacent cells. A sufficient number of cells are juxtaposed or stacked together to provide the desired voltage at the terminals of the battery. In the embodiment shown in Fig. 1 the assembled battery has a length greater than its other dimensions, and its longitudinal axis is perpendicular to the longitudinal axes of the cells. The assembled battery is compressed longitudinally to bring the elements of the cells into suitable pressure engagement with each other and to bring the bodies 22 of conductive composition of each pair of adjacent cells into pressure conductive contact with each other. The composition is plastic and the two contacting bodies substantially merge into each other and are shown in Fig. 2 as a single conductive element 22. The assembled cells are then bound together in their compressed arrangement by the band or tape 12, or other suitable means.

The outside electrodes of the end cells are connected respectively to the battery terminals 25 and 26. This is accomplished by any suitable means as the solder 27, as shown in Fig. 2, and, if desired, the opening 21 may be closed and sealed by a suitable non-conductive, electrolyte resistant composition 29, such as lacquer or varnish.

The end cell 10 has an additional wrapper 23 similar to wrapper 18 around the outside of wrapper 18, wrapper 23 having an opening 24 in the wall thereof between said end cell and the adjacent cell. Said opening 24 coincides with opening 21 in wrapper 18 for the accommodation of the cell connecting element 22. At the exposed side of said end cell the wrapper 23 does not have an opening but covers the opening 21 of the wrapper 18 and encloses a portion of the terminal conductor 25. The arrangement with respect to the cell 10 at the other end of the battery and the connection of terminal conductor 26 thereto may be similar to that which has been described.

By the means described the cells of the battery are connected in series and a relatively high voltage battery results. The output voltage is caused to have the value desired by regulating the number of cells, the number shown in Fig. 1 being arbitrary and not necessarily the actual number used in any case. The battery is initially manufactured in the electrolyte-free condition, and the introduction of electrolyte or activating liquid is delayed until it is desired to place the battery in service. It is then rendered operative by placing the open ends of the cells in contact with a suitable activating liquid. While, for the purposes of the invention, the character of the activating liquid is not critical or important, in the specific embodiment disclosed, a suitable liquid is a dilute solution of sodium chloride or plain water, such as tap water. The activating liquid may be introduced in any suitable manner as by introducing a small quantity into each of the open ends of the cells, but preferably it is introduced by momentarily contacting the open ends of the cells with a body of the liquid or by immersing the battery in such body. The liquid is absorbed by the electrolyte receiving elements 16 and the battery is thereby rendered operative.

In known batteries, in which the cells are in substantial alignment in the longitudinal direction of the battery and the open cell ends are not spaced apart, the activating liquid clings to the surfaces thereof at the open end and forms bridges between adjacent cells. Such bridges are conductive and constitute short circuits between the cells. In addition, they constitute bodies of electrolyte in which the positive and negative electrodes of adjacent cells normally assume different potentials, with the result that local electrolytic action takes place at the negative electrodes which causes a dissipation of the energy of the battery. Batteries of the character described are usually small and it is highly desirable that full voltage and energy be obtained from them.

In the battery illustrated in Figs. 1 and 2 the open ends of the cells of each pair of adjacent cells are effectively spaced from each other so that bridges of activating liquid are not formed between them and there is no substantial loss of voltage or energy. The spacing is the means for preventing such bridges. In accordance with the invention, such spacing is at least $\frac{1}{16}$ inch, which has been found to be the minimum distance to be beneficial in the prevention of bridging and short circuits. The spacing may be greater than this if desired. In the embodiment shown in Figs. 1 and 2 the spacing is equal to the distance one cell is off-set with respect to the adjacent cell.

Fig. 5 illustrates in fragmentary form a modification of the battery as shown in Figs. 1 and 2. In this embodiment adjacent cells are connected together by a wire conductor 31 which is connected by the solder 32 to the positive electrode 13 and negative electrode 17 of the two adjacent cells and passes through and is accommodated in the openings 21 in the cell wrappers 18. The soldered connections and preferably the entire area of the electrodes 13 and 17 which is exposed in the openings 21 are covered with a suitable non-conductive sealing composition 33, such as lacquer or varnish.

Fig. 6 illustrates the manner in which the cells in this last embodiment are connected together before they are assembled into the battery. Three cells 10 are illustrated, the intermediate cell being rotated broad-side through an angle of 180° with respect to the two outside cells. For convenience of illustration, the length of the conductors 31 is exaggerated in Fig. 6. Assuming that the negative electrodes 17 are adjacent to the visible openings 21 of the two outside cells shown in Fig. 6 and the positive electrode 13 adjacent to the visible opening of the middle cell, one of the conductors 31 is connected to the positive electrode of the first cell and the negative electrode of the second cell (from left to right in Fig. 6) and another conductor is connected to the positive electrode of the second cell and the negative electrode of the third cell, and so on. In this manner the positive and negative electrodes of each pair of adjacent cells are connected together. The visible (in Fig. 6) sides of the first and second cells are then brought together as indicated in Fig. 5; the invisible sides of the second and third cells are brought together, and so on until the battery is assembled, after which it is placed under compression and the assembly united by a tape as described heretofore in connection with Figs. 1 and 2.

A further embodiment is illustrated fragmentally in Fig. 7, in which a separate element for connecting the cells together is not employed, but rather the positive and negative electrodes of each pair of adjacent cells are brought into direct conductive contact with each other by the compression under which the battery is assembled. The negative electrode 17 of one cell is directly exposed to the positive electrode 13 of the adjacent cell through the openings 21 in the wrappers 18, and the compression exerted upon the battery longitudinally thereof causes the positive electrode 13 and the adjacent layer of depolarizing material 14 to undergo a bending or bulging into the opening 21 and into conductive contact with the negative electrode 17 of the adjacent cell. In the drawings, the thickness of the cell elements is greatly exaggerated for clearness of illustration and in actual practice, the thickness of the positive electrode is only a few thousandths of an inch and may be as little as .001 inch, and the depolarizing element 14 and the other elements possess sufficient flexibility to undergo the bending and bulging required to provide the conductive contact described. In this modification, the bulge of the electrode 13 is shown at 35 and is the means for connecting the cells together.

A further embodiment of the battery is illustrated in Fig. 8 in which the open ends of the cells are cut at a diagonal with respect to the longitudinal axis of the cell. The cells 40 are stacked together in substantial alignment in the direction of the longitudinal axis of the battery. They are oriented similarly with the planes of their faces perpendicular to the longitudinal axis of the battery and are held together in pressure engagement by the band or tape 41. The structure of the cells is the same as has been described in connection with cells 10 with the exception that the open ends are cut off at a diagonal as described heretofore. Also, the openings 42 in the walls of the cell wrappers and the intercell connections may be located more nearly at the centers of the broad sides of the cells, as shown in Fig. 9. The cells are made by first forming elongated strip-form blanks 19 as illustrated in Fig. 4 and then cutting these into individual cell lengths, the cutting being at a diagonal to the longitudinal axis of the blank. In the assembled battery, the cell ends are at a diagonal to the longitudinal axis of the battery and the diagonals on the same side of the battery bear the same directional relationship to the said longitudinal axis. The effect of the diagonal cell ends is to space said open ends apart, and the end surfaces of the cells are caused to be at such an angle to the longitudinal axis thereof that said open ends are spaced apart at least $\frac{1}{16}$ inch. The battery is provided with end terminals 43 and 44 in the same manner as described heretofore in connection with the terminals 25 and 26 of the battery of Figs. 1 and 2.

A further embodiment of the battery of the invention is illustrated in Figs. 10 and 11, in which alternate cells are rotated through an angle of 90° with respect to the intermediate cells. In this embodiment the cells 50 are similar to the cell 10 shown in Fig. 3 with the exception that the openings in the wrapper for the intercell connections are located substantially centrally of the broad sides of the cells. The cells are stacked together in juxtaposed relation with the alternate cells rotated edgewise through an angle of 90° with respect to the intermediate cells. The cells are connected together by means similar to that described heretofore and they are brought into pressure engagement and are held in assembled relation by the band or tape 52. The battery is provided with end terminals 53 and 54. In this embodiment, by reason of the fact that each cell is rotated through a substantial angle with respect to the adjacent cell, the open ends of said cells are spaced a substantial distance apart in accordance with the invention, which distance is $\frac{1}{16}$ inch or greater.

Another embodiment of the battery of the invention is illustrated fragmentally in Figs. 12, 13 and 14. In this embodiment, the cells 60 are similar to the cells 50 of the embodiment of Fig. 10, and the assembly of cells is held together and in pressure contact by the tape 62 which is similar to the tape 12 of the embodiment of Fig. 1. The cells are in substantial alignment longitudinally of the battery, and between each pair of adjacent cells is a separating element 64 of non-conductive, electrolyte-resistant material, such as paraffin-impregnated paper or paperboard, rubber hydrochloride, a polymer of ethylene, the copolymer of vinyl chloride and vinyl acetate, or the like. The separator 64 projects beyond the boundaries of the faces of the cells making contact therewith, whereby it serves as a means for preventing bridging of electrolyte or activating liquid from one cell to another and particularly from the negative electrode of one cell to the positive electrode of the adjacent cell. For this purpose the functional parts of the separator 64 are the two end portions which extend beyond the ends of the cells and beyond the sides at and just inwardly of the ends of the cells. The projection should be at least $\frac{1}{32}$ inch beyond the boundaries of the cells at these points in order that the effective distance between the open ends of adjacent cells is at least $\frac{1}{16}$ inch, the minimum distance which is beneficial in the prevention of electrolyte bridges. The separator 64 is preferably relatively stiff so that it is not readily bent or folded in use, and it is notched at the median portions of its side edges as shown at 66 to accommodate the tape 62. A substantially centrally located opening 68 is provided in each separator 64 through which opening adjacent cells may be electrically connected by suitable means (not shown), such as the conductive wax 22 or the conductor 31 illustrated in Figs. 2 and 5 respectively. The assembled battery has a terminal conductor at each end, one of which is illustrated at 70.

The activation of the various embodiments may be accomplished in the same manner as described heretofore in connection with the embodiment of Figs. 1 and 2.

While several embodiments of the invention have been described and illustrated, the invention is not limited thereto and modifications and changes may be made as will occur to those skilled in the art. As stated heretofore, the composition of the various cell elements is not important and other systems than that specifically described may be used as desired. For example, instead of employing magnesium and silver electrodes and a depolarizing body of silver chloride, the electrodes may be composed of magnesium and copper and the depolarizing body may be cuprous chloride. In such a cell, the activating liquid may be water or a dilute solution of a suitable salt. The cell system may be of the Leclanche type, employing zinc and carbon electrodes, a depolarizer of a mixture of powdered manganese dioxide and carbon and an electrolyte of an aqueous solution of zinc chloride and ammonium chloride. The conductive wax described heretofore is a satisfactory means for connecting the zinc and carbon electrodes of adjacent cells. It is contemplated that the invention is not limited in any respect with regard to the system of cell elements, and that any system may be employed as is desired.

What is claimed is:

1. A primary battery adapted for energization by contact with a body of activating liquid, comprising a plurality of juxtaposed series-connected flat cells, each of said cells comprising a sandwich-like arrangement of flat cell elements including a pair of dissimilar electrodes forming respectively the facings of said cell and an electrolyte-receptive element between said electrodes, a substantially electrolyte-impervious wrapper enclosing each said cell upon all except two opposite exterior surfaces thereof and leaving said two opposite surfaces exposed, the edge surfaces of said cell elements being exposed at said exposed cell surfaces, in each pair of adjacent cells an electrode of one being adjacent to the dissimilar electrode of the other, said adjacent cells being so placed with respect to each other that the exposed surfaces of said adjacent dissimilar electrodes are spaced apart a sufficient distance to prevent appreciable local action after the battery is activated.

2. A primary battery adapted for energization by contact with a body of activating liquid, comprising a plurality of juxtaposed series-connected flat cells of generally rectangular shape, each of said cells comprising a sandwich-like arrangement of flat cell elements including a pair of dissimilar electrodes forming the flat facings of said cells, and an electrolyte-receptive element between said electrodes, a substantially electrolyte-impervious wrapper enclosing each said cell upon all except two opposite surfaces thereof and leaving said two surfaces exposed, the edges of said cell elements at each of said exposed surfaces terminating substantially in a flat plane, said wrapper extending upon each said covered cell surface to the planes of said exposed surfaces, in each pair of adjacent cells an electrode of one being adjacent to the dissimilar electrode of the other, said adjacent cells being displaced a substantial distance with respect to each other along the planes of said flat facings thereof so that the exposed edges of said adjacent dissimilar electrodes are spaced apart sufficiently to prevent appreciable local action after the battery is activated.

3. A rectangular flat primary cell comprising a sandwich-like arrangement of rectangular flat cell elements including an electrolyte-receptive element and two electrodes, said electrodes forming respectively the top and bottom flat facings of said cell, a substantially electrolyte-impervious wrapper coextensive with said flat facings and extending around a perimeter of said cell and leaving the two end surfaces thereof exposed, each exposed cell end being a composite of the exposed end surfaces of said cell elements and said wrapper, the exposed end surfaces of the cell elements and the wrapper being substantially in the same transverse plane.

4. The method of making primary cells which comprises assembling in sandwich-like relation a plurality of elongated, flat, ribbon-like cell elements including a pair of electrode elements and an electrolyte-receptive element between said electrode elements, said cell elements being continuous and uniform throughout the lengths thereof and said electrolyte-receptive element being in contact with both of said electrode elements, laterally encasing said assembly of cell elements in a wrapper of non-conductive, electrolyte-impervious material to form an elongated strip-form cell blank, and severing said strip-form cell blank transversely into lengths to form individual cells.

5. A primary battery adapted for energization by contact with a body of activating liquid, comprising a plurality of juxtaposed series-connected flat cells, each of said cells comprising a sandwich-like arrangement of flat cell elements including a pair of dissimilar electrodes forming respectively the facings of said cell and an electrolyte-receptive element between said electrodes, a substantially electrolyte-impervious wrapper enclosing each said cell upon all except two opposite exterior surfaces thereof and leaving said two opposite surfaces exposed, the edge surfaces of said cell elements being exposed at said exposed cell surfaces, in each pair of adjacent cells an electrode of one being adjacent to the dissimilar electrode of the other, said exposed surfaces of said cells being exposed on the same two opposite sides of said battery, each cell being offset in the direction of an exposed surface thereof with respect to the cell adjacent thereto, the offset of each succeeding cell being in a direction opposite to that of the last so that a staggered succession of cells is formed and the exposed surfaces of said adjacent dissimilar electrodes are spaced apart a sufficient distance to prevent appreciable local action after the battery is activated.

6. A primary battery adapted for energization by contact with a body of activating liquid, comprising a plurality of juxtaposed series-connected flat cells of generally rectangular shape, each of said cells comprising a sandwich-like arrangement of flat cell elements including a pair of dissimilar electrodes forming the flat facings of said cells, and an electrolyte-receptive element between said electrodes, a substantially electrolyte-impervious wrapper enclosing each said cell upon all except two opposite surfaces thereof and leaving said two surfaces exposed, the edges of said cell elements at each of said exposed surfaces terminating substantially in a flat plane, said wrapper extending upon each said covered cell surface to the planes of said exposed surfaces, in each pair of adjacent cells an electrode of one being adjacent to the dissimilar electrode of the other, the exposed surfaces of said cells being exposed on the same two opposite sides of said battery, the exposed surfaces of each cell including the wrapper thereof being cut off at a diagonal with respect to the planes of said flat cell elements, the diagonals on the same side of said battery extending in the same direction, said diagonals being at such an angle that the exposed edges of said adjacent dissimilar electrodes are spaced apart sufficiently to prevent appreciable local action after the battery is activated.

7. A primary battery adapted for energization by contact with a body of activating liquid, comprising a plurality of juxtaposed series-connected flat cells of generally rectangular shape, each of said cells comprising a sandwich-like arrangement of flat cell elements including a pair of dissimilar electrodes forming the flat facings of said cells, and an electrolyte-receptive element between said electrodes, a substantially electrolyte-impervious wrapper enclosing each said cell upon all except two opposite surfaces thereof and leaving said two surfaces exposed, the edges of said cell elements at each of said exposed surfaces terminating substantially in a flat plane, said wrapper extending upon each said covered cell surface to the planes of said exposed surfaces, in each pair of adjacent cells an electrode of one being adjacent to the dissimilar electrode of the other and the longitudinal axis of one cell being approximately perpendicular to the longitudinal axis of the other cell, whereby the exposed edges of said adjacent dissimilar electrodes are spaced apart sufficiently to prevent appreciable local action after the battery is activated.

8. A cell blank in elongated strip form adapted to be severed transversely into individual cells, comprising a sandwich-like arrangement of elongated, flat, ribbon-like cell elements including a pair of electrode elements and an electrolyte-receptive element between and in contact with said electrode elements, said cell elements being continuous and uniform throughout their lengths, and an elongated non-conductive electrolyte-impervious wrapper laterally encasing said strip of assembled elements throughout its length.

9. A primary battery adapted for energization by contact with a body of activating liquid, comprising a plurality of juxtaposed series-connected flat cells, each of said cells comprising a sandwich-like arrangement of flat cell elements including a pair of dissimilar electrodes forming respectively the facings of said cell and an electrolyte-receptive element between said electrodes, a substantially electrolyte-impervious wrapper enclosing each said cell upon all except two opposite exterior surfaces thereof and leaving said two opposite surfaces exposed, the edge surfaces of said cell elements being exposed at said exposed cell surfaces, in each pair of adjacent cells an electrode of one being adjacent to the dissimilar electrode of the other, and means for increasing sufficiently the length of the electrolytic path between the exposed surfaces of said adjacent dissimilar electrodes to prevent appreciable local action after the battery is activated.

JOSEPH J. COLEMAN.
MILTON E. WILKE.

References Cited in the file of this patent

UNITED STATES PATENTS

| Number | Name | Date |
|---|---|---|
| 2,478,632 | Lockwood et al. | Aug. 9, 1949 |
| 2,519,527 | Wilkinson | Aug. 22, 1950 |
| 2,564,495 | Mullen | Aug. 14, 1951 |

FOREIGN PATENTS

| Number | Country | Date |
|---|---|---|
| 248,942 | Great Britain | Mar. 18, 1926 |
| 363,135 | France | Apr. 25, 1906 |